Figure 1:
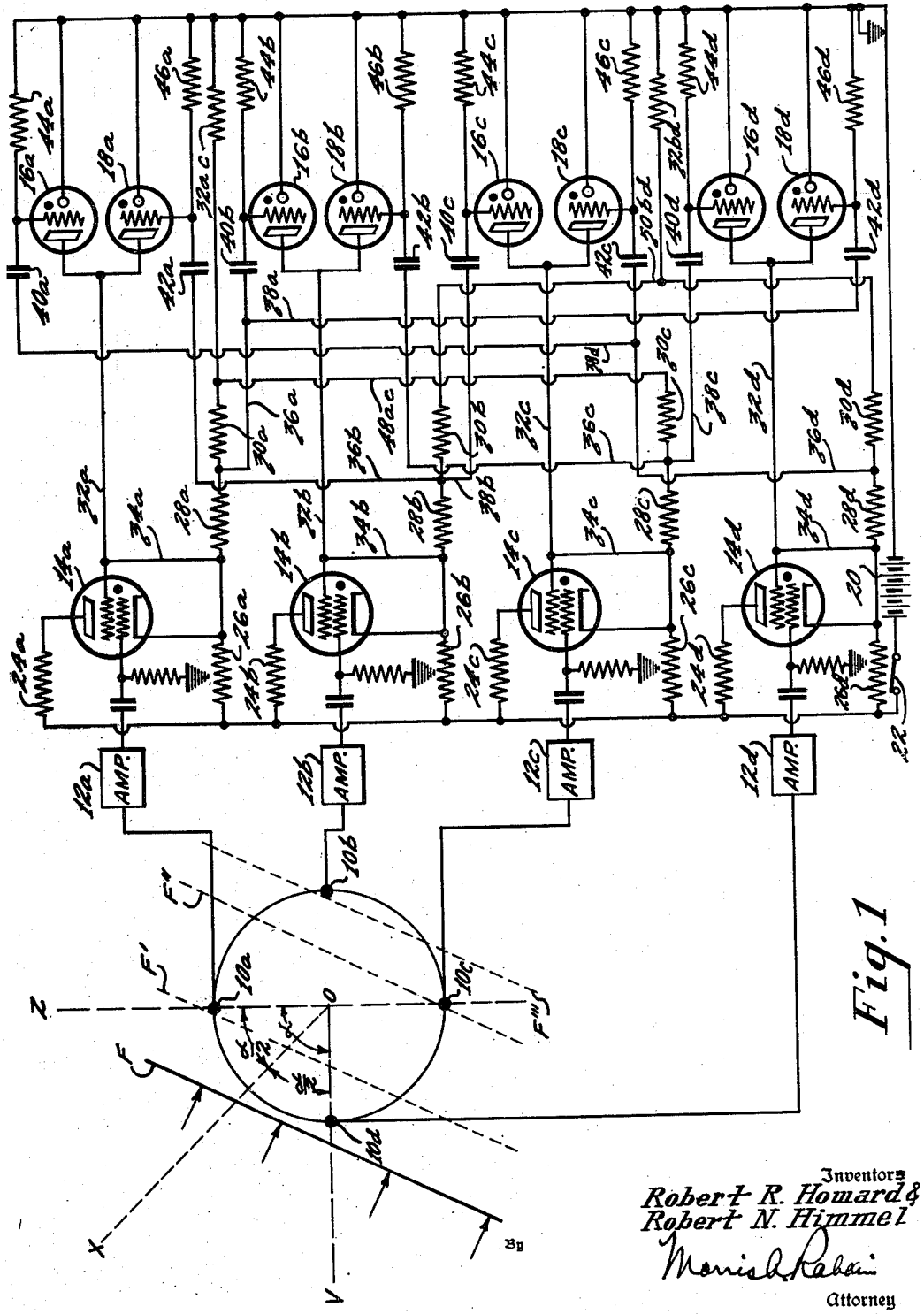

Patented Dec. 26, 1950

2,535,134

UNITED STATES PATENT OFFICE 2,535,134

SOUND LOCATING EQUIPMENT

Robert R. Howard, Oak Park, Ill., and Robert N. Himmel, Collingswood, N. J., assignors to Radio Corporation of America, a corporation of Delaware Application July 27, 1948, Serial No. 40,914

10 Claims. (Cl. 177—352)

This invention relates to improvements in timing and sequence indicators, and while not limited thereto, finds particular application in sound locating devices and the like.

In the art of sound locating, for example, it is well known that the direction in which a compressional wave is traveling may be determined by means of two or more transducers arranged to intercept the traveling wave, the arrangement being such that the direction in which the wave is traveling may be deduced from the sequence in which the transducers are energized by the wave, and the time between the arrivals of the wave at the two transducers.

A common method of obtaining the desired information is by the use of relays, one relay being operated by each of the transducers as the latter are energized. However, the mechanical inertia of the relays imposes definite limitations on the speed of response of such a system, as well as introducing appreciable factors of error.

It is a principal object of the present invention to provide an improved system for indicating the sequence of occurrence of two or more events, such as the order of the arrivals of a compressional wave at two or more spaced points.

A further object is to provide an improved system for determining the time interval between the occurrence of two events.

Another object is to provide a timing and/or sequence indicating system having no mechanical inertia limitations.

According to the invention, the foregoing and other objects and advantages are obtained by means of a plurality of signal channels each having a trigger device which, as the term is used in the following description and appended claims, will be understood to mean a device of the type which remains inactive until supplied with an impulse of energy, whereupon said device is caused to respond to said impulse and to initiate one or more sequential operations in the circuits associated with said device. Each of the channels is also provided with a pair of indicator tubes, the arrangement being such that when any one of the trigger devices is energized, the energized device developes anode voltages for the indicator tubes associated therewith, and at the same time supplies a trigger voltage to the control grid of one of the indicator tubes in each of the adjacent channels. A similar action takes place when either of the adjacent channels is energized and, as a result, one or the other of the indicator tubes in the first channel to be energized is triggered, thus giving an indication of which circuit was first energized. Alternately related channels in the system are coupled together in such a way that any possibility of ambiguity in the indications is eliminated. An important modification of the invention provides a system for obtaining increased resolution of the desired information by means of trigger time control networks.

Figure 2:
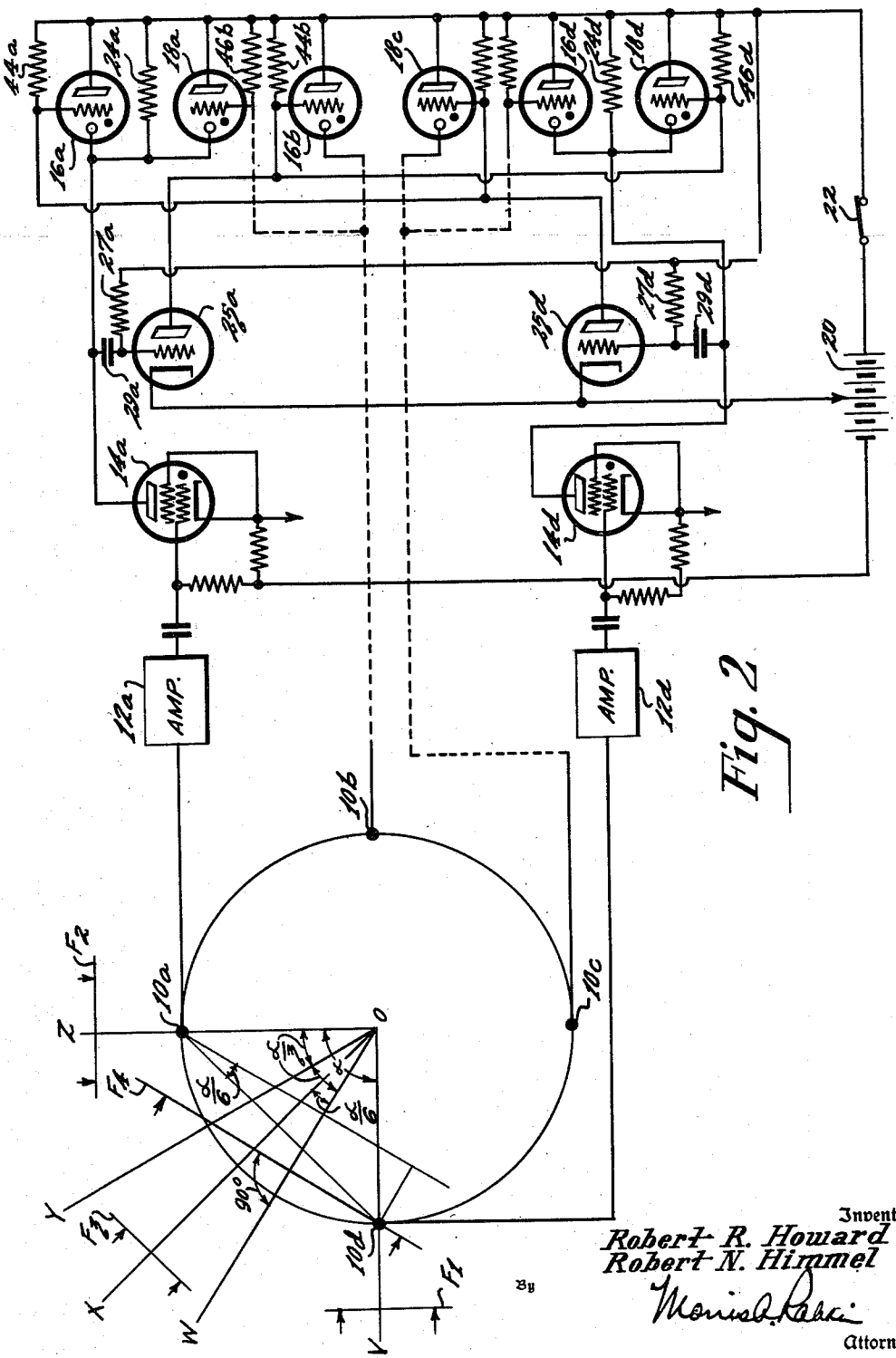

A more complete understanding of the invention may be had by reference to the following description of illustrative embodiments thereof, when considered in connection with the accompanying drawing in which:

Figure 1 is a schematic diagram illustrating the principles of the invention as applied to a sound locating system, and Figure 2 is a circuit diagram of a modified form of the invention.

For the purposes of simple disclosure, the invention will be explained as applied to a sound locating system, and accordingly, there are shown in Figure 1 four transducers 10a, 10b, 10c, 10d, such as microphones or the like, arranged in a circle. Each transducer constitutes the input element or signal voltage source for one of four substantially identical signal channels, the components of which are given similar reference characters differentiated by subscripts $a$, $b$, $c$, and $d$. For the sake of simplicity, the channel for a single transducer 10a will be described, it being understood that the channels for the other transducers 10b, 10c, and 10d are similar in nature.

The transducer 10a may be connected through an amplifying stage 12a to a trigger circuit, which may include a gaseous four-element tube 14a of the so-called thyratron type, as shown, or any other desired type of trigger device as previously defined. The channel is also provided with a pair of indicator elements 16a, 18a which are shown in the drawing as being of the well-known cold-cathode, 3 element, glow discharge type electron tubes, although other indicating devices which require an energizing voltage and a separate control voltage to produce an indication may be used.

A common source of supply voltage 20 is provided for all of the trigger circuits, and connections through a switch 22 are made from the source 20 to the anode of each of the thyratrons, such as to the anode of the thyratron 14a through a load resistor 24a. Bias voltage for the thyratron 14a is also made available from a voltage dividing network consisting of resistors 26a, 28a, 30a and 32ac connected across the voltage supply line, the cathode of the thyratron 14a being connected to the voltage divider between the resistors 26a and 28a as shown, so that the resistors 28a, 30a, and 32ac also serve as a cathode load circuit for the thyratron 14.

The anodes of the indicator tubes 16a, 18a are connected to the cathode of the associated thyratron 14a by leads 32a and 34a, and while a constant voltage corresponding to the bias voltage on the thyratron 14a is applied across the indicators by these connections, this voltage is insufficient to cause the indicator tubes to be fired even if a triggering impulse is supplied to the control grids of the indicator tubes. However, when the thyratron 14a conducts current, the resulting voltage across the cathode load resistors 28a, 30a and 32ac applied between the anodes and cathodes of the associated indicator tubes 16a, 18a is sufficient to allow the indicator tubes 16a, 18a to be fired if a suitable triggering pulse is supplied to the control grids of the indicator tubes.

Connections 36a, 38a are provided from the junction of the cathode load resistors 28a, 30a of the thyratron 14a to the grid of one of the indicator tubes 16b, 18d in each adjacent channel through coupling capacitors 40b, 42d, so that when the thyratron 14a is fired, a trigger voltage will be supplied to the grids of one of the indicator tubes 16b, 18d in each adjacent channel. Grid returns for the indicator tubes 16a, 18a are provided through resistors 44a, 46a connected back to the low voltage side of the system.

Connections 48ac and 50bd are provided between the cathode resistors 30a and 30c of the thyratrons 14a and 14c, and between the cathode resistors 30b and 30d of the thyratrons 14b and 14d, respectively, in alternately related channels in the system, so that the system in effect is divided into two groups of channels. If one of the thyratrons in either group is fired, the resulting voltage drop across the common resistor 32ac (or 32bd) is sufficient to render the other thyratron in that group insensitive to subsequent trigger voltages which may be supplied to its control grid.

The operation of the circuit of Figure 1 is as follows:

Assuming that a sound wave, with a front represented by the line F in Figure 1 is approaching the transducers in the direction indicated by the arrows, the wave front F will first reach the transducer 10d, and a pulse of energy will be generated in the transducer 10d which will be amplified in the amplifier 12d and passed on to the control grid of the thyratron 14d. The thyratron 14d will begin to conduct current, and as was previously described, the resulting voltage increase across the cathode resistors 28d, 30d, and 32bd will furnish a continuing anode voltage for the indicator tubes 16d, 18d, while the sudden voltage change across the cathode resistors 30d, 32bd will supply a trigger pulse to the control grids of the indicator tubes 16a, 18c in the adjacent channels. However, no anode voltage will be available for the indicators 16a, 18c at this time so they will not respond, and since no trigger pulse has been supplied to the indicator tubes 16d, 18d, all of the indicator tubes will remain quiescent. At the same time, the voltage drop across the cathode load resistors 28d, 30d, 32bd of the thyratron 14d which has been triggered, will be applied to the cathode of the thyratron 14b in the alternately related channel through the lead 50bd, and this channel will therefore become insensitive to trigger voltages which it may subsequently receive. The significance of this feature of the circuit will be explained presently.

The wave front F will next reach the transducer 10a, as is represented by the broken line F'. As a result, the channel corresponding to the transducer 10a will be energized and will go through the same sequence of operation that has just been described for the channel of the transducer 10d, with the exception that anode voltage will be available for the indicator tube 18d in the adjacent channel from the voltage drop across the cathode resistors of the thyratron 14d. Thus, the trigger pulse which will now be supplied to the grid of the indicator tube 18d by the firing of the thyratron 14a will be effective to start conduction in the indicator tube 18d, and this tube will show the "glow" effect characteristic of this type of indicator. At the same time, the triggering of the thyratron 14a will be effective to render its alternately related thyratron 14c insensitive, and since the thyratron 14b will have been made insensitive by the triggering of the thyratron 14d, none of the remaining indicators will be fired when the wave front F subsequently arrives at the other two transducers 10c and 10b. Thus, the possibility of ambiguous indications is eliminated. After the indication provided by any of the indicator tubes has been noted, the system may be reset by opening the switch 22 to remove the anode voltage from all of the thyratrons. The switch 22 may be arranged for either manual or automatic operation in any desired manner.

When a system of the type described is used in conjunction with sound locating equipment, as in Figure 1, the degree of resolution attainable in determining the direction of travel of a sound wave is dependent on a number of factors, including the number of transducers used, the configuration of the system, the spacing between transducers, etc. In general, where the transducers are located at equally spaced points around a circle as in Figure 1, or along an arc thereof, the direction of travel of the wave may be indicated within an angle $a/2$ equal to ½ of the angular separation $a$ of the transducers. Thus, for the indication given by the wave front F of Figure 1, the direction of travel is known to lie between the lines VO and XO, as is evident from the following considerations: If the wave front F had been traveling exactly along the line VO, then the transducer 10d would have been energized first, supplying anode voltage to its indicator tubes 16d, 18d and the transducers 10a and 10c would then have been energized simultaneously so that both of the indicators 16d and 18d would have received trigger pulses from the channels of the transducers 10a and 10c adjacent to the transducer 10d, and both indicator 16d and indicator 18d would glow, indicating that the wave front F was traveling exactly along the line VO through the transducer 10d and the center of the circle. If the wave front F had been traveling exactly along the line XO in Figure 1, then the transducers 10a and 10d would be energized simultaneously. As a result, the indicators 16a and 18d would receive both anode voltage and trigger voltage at the same instant, causing both tubes 16a, 18d to glow. This would indicate that the wave front F was traveling exactly along the line XO which bisects the angle VOZ between the two transducers 10a and 10d. Hence, for the configuration of Figure 1, where the angular separation of the transducers is 90°, the direction of travel of a sound wave may be determined within 45°, and by using a greater number of transducers, or by using a closer spacing of the transducers along an arc of a circle, the resolution attainable in determining the direction of travel of the sound wave may be increased. The latter arrangement could be adopted, for example, where the general direction of travel of the wave is known and it is desired to obtain more exact information.

Where greater resolution is required than is afforded by the system shown in Figure 1, a modified form of the invention may be used to determine the direction of travel of a wave within ⅓ of the angular distance $a$ between two transducers. An example of a circuit of this type is shown in Figure 2 where, for simplicity the complete channels for only two transducers 10a and 10d are shown, only such parts of the channels for the transducers 10c and 10b being shown as are necessary for an understanding of the system. As before, the channel for a single transducer 10a will be described, with similar considerations being understood to apply to the adjacent channel for the transducer 10d, as well as to the channels (not shown) for the transducers 10b and 10c, and the mode of operation of the complete circuit will then be explained.

The transducer 10a is provided with a trigger element such as the thyratron tube 14a, and with a pair of indicator tubes 16a, 18a. A common voltage supply 20 is also provided, from which anode voltage for the thyratron 14a is obtained through a load resistor 24a and through a reset switch 22. The indicator tubes 16a, 18a are connected in parallel with the load resistor 24a, so that conduction in the thyratron 14a will produce a sufficient voltage drop across the load resistor 24a to energize the indicator tubes if a trigger voltage is supplied to the control grids of the indicator tubes.

The increased resolution which may be obtained with the circuit of Figure 2 is made possible by the use of trigger tie control networks which are effective to increase the time interval during which trigger voltages are applied to the indicating elements. An illustrative control network may include a triode element 25a, the anode of which is connected to the voltage supply 20 through the grid resistors 44b and 46d of the indicator tubes 16b, 18d in the channels of the transducers 10b, 10d. The cathode of the triode 25a is returned to a point on the voltage supply 20 which will give a suitable bias to normally maintain the tube 25a in the conducting state, and the control grid of the triode 25a is connected to the positive side of the voltage supply 20 through a grid resistor 27a. The grid of the triode 25a is also coupled to the output side of the thyratron 14a through a capacitor 29a, which, together with the grid resistor 27a, largely determines the time control period of the circuit.

The principle on which the circuit of Figure 2 is based may be explained as follows:

If the circuit of Figure 2 were to function in a manner identical to that of the circuit of Figure 1, then a wave front $F_1$ which approaches the transducers 10a, 10b, etc., along the line VO of Figure 2, would cause the indicators 16d, 18d to glow as was previously described; a wave front $F_2$ which approached the transducers along the line ZO of Figure 2 would cause the indicators 16d, 18d to glow; a wave front $F_3$ which approached the transducers along the line XO of Figure 2 would cause the indicators 16a, 18d to glow; and a wave front traveling along any other line lying within the angle VOZ between the two transducers 10a and 10d would cause either the indicator 16a or the indicator 18d to glow. The angles VOX and XOZ would, therefore, represent "areas of uncertainty" for the system, and the margin of error for the system would be equal to $$a/2$$

if $a$ were the angular separation of the transducers. However, if a circuit is provided which will give the same indication for waves traveling along any line within the center ⅓ WOY of the angle VOZ that it would normally give for waves traveling exactly along the bisector XO of the angle VOZ, then the margin of error for the system will be reduced to $a/3$. This would, of course, mean that both of the indicator tubes 16a, 18d would glow in response to wave fronts approaching the system along any line within the angle WOY of Figure 2, while either the indicator 16a or the indicator 18d would be fired by signals arriving outside of the angle WOY, but within the angle VOZ.

It will be recalled that, in the circuit of Figure 1, the triggering pulses supplied to the indicator tubes by the thyratron in an adjacent channel were of short duration, and ineffective to ignite the indicator tubes unless, at the same instant, anode voltage was being applied to the indicators. In the circuit of Figure 2, the trigger voltage supplied to an indicator tube is caused to remain effective for a period of time sufficient to permit the indicator tube to be ignited by an anode voltage applied within a limited time after trigger voltage has been applied. Thus, in Figure 2, if a traveling wave front $F_4$ is approaching the system along the line WO (which is one side of the center ⅓ WOY of the angle VOZ between the transducers 10a, 10b), the wave front $F_4$ will first reach the transducer 10d, causing the thyratron 14d to fire. When the thyratron 14d fires, the resulting flow of current through the load resistor 24d will produce a voltage across the resistor 24d which will be adequate to serve as anode voltage for the indicator tubes 16d, 18d. At the same time, the drop in voltage which occurs at the anode of the thyratron 14d is passed on to the control grid of the time control triode 25d, through the capacitor 29d, stopping conduction in the triode 25d, and causing a sudden rise in voltage at the anode of the triode 25d. This rise in voltage serves as a trigger voltage for the indicator tubes 16a, 18c in the adjacent channels, but since no anode voltage will be available at that time for the indicator tubes 16a, 18c, they will remain quiescent. The triode 25d will remain cut off until the voltage across the capacitor 29d changes by an amount sufficient to allow the grid voltage of the tube 25d to rise above the cut off level. As is well known, the change in capacitor voltage will be exponential in nature and the time T during which the triode 25d will remain non-conducting will be determined from the expression:

$$e_{co} = E\epsilon^{-\frac{T}{RC}}$$

wherein $e_{co}$ = the cut-off grid voltage for the tube 25d
E = the voltage across the resistor 24d
T = the cut-off period for the tube
R = the resistance of the resistor 27d
C = the capacitance of the capacitor 29d
epsilon = the base of the Napierian system of logarithms If the time T during which the tube 25d remains cut off is made equal to the time T required for the wave front F₄ to travel from the first transducer 10d to the second transducer 10a then trigger voltage will still be available for the indicator tube 16a when the thyratron 14a fires and supplies anode voltage to the indicator tube 16a. When the thyratron 14a fires, a trigger voltage will be supplied to the indicator tube 18d from the anode of the control triode 25a and hence both the indicator tubes 16a, 18d will glow. Thus, by providing each trigger circuit in the system with a time control section, the resolution attainable in determining the direction of travel of a wave is increased from $a/2$ to $a/3$ where $a$ is the angular separation of the transducers. By reference to Figure 2, it can readily be shown that the time T during which the tube 25a should remain non-conducting may be determined from the expression:

$$T = \frac{D \sin \frac{\alpha}{6}}{V}$$

wherein:

T = the time required for a wave traveling along the line VO in Figure 2 to travel from the first transducer 10d to the second transducer 10a (which is the time the tube 25a should remain cut off).
D = the linear distance between the two transducers 10d, 10a.
$a$ = the angular separation of the transducers 10d, 10a.
V = the velocity of the wave in the medium being used (e. g. air, water, etc.).

When the time T has been determined for a particular system, then the values of R and C can be regulated to give the desired result.

Since many changes could be made in the circuits shown and described, within the scope and spirit of the invention, the foregoing is to be construed as illustrative and not in a limiting sense.

What is claimed is:

1. In an apparatus for indicating the order of operation of a plurality of signal voltage sources, in combination, a signal channel for each of said sources including (1) a trigger device responsive to signal voltages from its associated source and (2) a pair of indicating elements each responsive only to simultaneously applied energizing voltage and trigger voltage, a source of energizing voltage, means coupled between said energizing source and said trigger devices to supply energizing voltage to the indicating elements in any given channel in response to triggering of the trigger device in that channel by a signal voltage, and means coupling the trigger device in each channel to one indicator in each of two other of said channels to furnish a triggering voltage to said other channel indicators so that any given indicator will respond only after the trigger device in its own channel and the trigger device in another of said channels have both been triggered in predetermined sequence.

2. In an apparatus for indicating the order of operation of a plurality of signal voltage sources, in combination, a signal channel for each of said sources including (1) a trigger device responsive to signal voltages from its associated source and (2) a pair of indicating elements each responsive only to simultaneously applied energizing voltage and trigger voltage, a source of energizing voltage, means coupled between said energizing source and said trigger devices to supply energizing voltage to the indicating elements in any given channel in response to triggering of the trigger device in that channel by a signal voltage, means coupling the trigger device in each channel to one indicator in each of two other of said channels to furnish a triggering voltage to said other channel indicators so that any given indicator will respond only after the trigger device in its own channel and the trigger device in another of said channels have both been triggered in predetermined sequence, and means controlling the duration of the time interval during which trigger voltage will be supplied to said given indicator after said trigger device in said another channel has been triggered.

3. In an apparatus for indicating the order of operation of a plurality of signal voltage sources, in combination, a signal channel for each of said sources including (1) a gas filled trigger tube connected to be triggered by signal voltage from its associated source and (2) a pair of indicating elements each responsive only to simultaneously applied energizing voltage and trigger voltage, a source of energizing voltage, a load circuit for each of said trigger tubes, means including said load circuit coupled between said energizing source and said trigger tubes to supply energizing voltages to the indicating elements in any given channel in response to triggering of the trigger device in that channel by a signal voltage, and means coupling the trigger tube in each channel to one indicator in each of two other of said channels to furnish a triggering voltage to said other channel indicators so that any given indicator will respond only after the trigger tube in its own channel and the trigger tube in another of said channels have both been triggered in predetermined sequence.

4. In an apparatus for indicating the order of operation of a plurality of signal voltage sources, in combination, a signal channel for each of said sources including (1) a gas filled trigger tube adapted to be triggered by signal voltage from its associated source and (2) a pair of indicating elements each responsive only to simultaneously applied energizing voltage and trigger voltage, a source of energizing voltage, a load circuit for each of said trigger tubes, means including said load circuit coupled between said energizing source and said trigger tubes to supply energizing voltage to the indicating elements in any given channel in response to triggering of the trigger tube in that channel by a signal voltage, means coupling the trigger tube in each channel to one indicator in each of two other of said channels to furnish a triggering voltage to said other channel indicators so that any given indicator will respond only after the trigger tube in its own channel and the trigger tube in another of said channels have both been triggered in predetermined sequence, and means controlling the duration of the time interval during which trigger voltage will be supplied to said given indicator after said trigger tube in said another channel has been triggered.

5. In an apparatus for indicating the order of operation of a plurality of signal voltage sources, in combination, a signal channel for each of said sources including (1) a trigger device responsive to signals from its associated source and (2) a pair of indicating elements each responsive only to simultaneously applied energizing voltage and trigger voltage, said channels being connected into two groups, the arrangements being such that when the trigger device in one channel of either of the groups of channels is triggered by a signal from its associated source, the other channels in that group are rendered unresponsive to signals received thereafter from their associated signal sources, a source of energizing voltage, means coupled between said energizing source and said trigger devices to supply energizing voltage to the indicating elements in any given channel in response to triggering of the trigger device in that channel by a signal voltage, and means coupling the trigger device in each channel of a given group to one indicator in each of two channels in the other of said groups to furnish a triggering voltage to said other channel group indicators so that any given indicator will respond only after the trigger device in its own channel and the trigger device in a channel in another channel group have both been triggered in predetermined sequence.

6. In an apparatus for indicating the order of operation of a plurality of signal voltage sources, in combination, a signal channel for each of said sources including (1) a trigger device responsive to signals from its associated source and (2) a pair of electrical indicating elements each responsive only to simultaneously applied energizing voltage and trigger voltage, said channels being connected into two groups, the arrangement being such that when the trigger device in one channel of either of the groups of channels is triggered by a signal from its associated source, the other channels in that group are rendered unresponsive to signals received thereafter from their associated signal sources, a source of energizing voltage, means coupled between said energizing source and said trigger devices to supply energizing voltage to the indicating elements in any given channel in response to triggering of the trigger device in that channel by a signal voltage, means coupling the trigger device in each channel of a given group to one indicator in each of two channels in the other of said groups to furnish a triggering voltage to said other channel group indicators so that any given indicator will respond only after the trigger device in its own channel and the trigger device in a channel in another channel group have both been triggered in predetermined sequence, and means controlling the duration of the time interval during which trigger voltage will be supplied to said given indicator after said trigger device in said another channel group has been triggered.

7. In an apparatus for indicating the order of operation of a plurality of signal voltage sources, in combination, a signal channel for each of said sources including (1) a gas filled trigger tube having at least a cathode, an anode, and a control electrode, and (2) a pair of indicating elements, each of said elements having at least an anode, a cathode, and a control electrode, means connecting each of said sources to the control electrode of its associated trigger tube, a source of anode voltage for said tubes, a load circuit for each of said tubes across which a voltage is developed when said tube is triggered, means coupling the load circuit of each of said trigger tubes between the anode and the cathode of each element of the pair of indicating elements associated with each said tube, and means coupling the trigger tube in each channel to the control electrode of one indicating element in each of two other of said channels to furnish a triggering voltage to said other channel indicators so that any given indicator will respond only after the trigger tube in its own channel and the trigger tube in another of said channels have both been triggered in predetermined sequence.

8. In an apparatus for indicating the order of operation of a plurality of signal voltage sources, in combination, a signal channel for each of said sources including (1) a gas filled trigger tube having at least a cathode, an anode, and a control electrode, and (2) a pair of indicating elements, each of said elements having at least an anode, a cathode, and a control electrode, means connecting each of said sources to the control electrode of its associated trigger tube, a source of anode voltage for said tubes, a load circuit for each of said tubes across which a voltage is developed when said tube is triggered, means coupling the load circuit of each of said trigger tubes between the anode and the cathode of each element of the pair of indicating elements associated with each said tube, means coupling the trigger tube in each channel to the control electrode of one indicating element in each of two other of said channels to furnish a triggering voltage to said other channel indicators so that any given indicator will respond only after the trigger tube in its own channel and the trigger tube in another of said channels have both been triggered in predetermined sequence, and means controlling the duration of the time interval during which trigger voltage is applied the control electrodes of said given indicator after said trigger tube in said another channel has been triggered.

9. In an apparatus for indicating the order of operation of a plurality of signal voltage sources, in combination, a signal channel for each of said sources including (1) a gas filled trigger tube having at least a cathode, an anode, and a control electrode, (2) a pair of indicating elements, each of said indicating elements having at least an anode, a cathode, and a control electrode, and (3) a trigger time control network including a vacuum tube having at least a cathode, an anode, and a control electrode, means connecting each of said sources to the control electrode of its associated trigger tube, a source of anode voltage for said tubes, a load circuit for each of said trigger tubes across which a voltage is developed when said tube is triggered, means coupling the load circuit of each of said trigger tubes between the anode and the cathode of each element of the pair of indicating elements associated with each said tube, means coupling the trigger tube in each channel to the control electrode of the vacuum tube in that channel, and means coupling the vacuum tube in each channel to the control electrode of one indicating element in each of two other of said channels to furnish a controlled duration trigger voltage to said other channel indicators so that any given indicator will respond only after the trigger tube in its own channel and the trigger tube in another of said channels have both been triggered in predetermined sequence and within a time interval determined by said time control network.

10. In an apparatus for indicating the order of operation of a plurality of signal voltage sources, in combination, a signal channel for each of said sources including (1) a gas filled trigger tube having at least a cathode, an anode, and a control electrode, and (2) a pair of indicating elements, each of said elements having at least an anode, a cathode, and a control electrode, said channels being connected into two groups, the arrangement being such that when the trigger device in one channel of either of the groups of channels is triggered by a signal from its associated source, the other channels in the same group are rendered unresponsive to signals received thereafter from their associated signal sources, means connecting each of said sources to the control electrode of its associated trigger tube, a source of anode voltage for said tubes, a load circuit for each of said tubes across which a voltage is developed when each said tube is triggered, means connecting the load circuit of each of said trigger tubes between the anode and the cathode of each element of the pair of indicating elements associated with each said tube, and means coupling the trigger tube in each channel of a given group to the control electrode of one indicating element in each of two channels in the other of said groups to furnish a triggering voltage to said other channel group indicators so that any given indicator will respond only after the trigger tube in its own channel and the trigger tube in a channel in another channel group have both been triggered in predetermined sequence.

ROBERT R. HOWARD.
ROBERT N. HIMMEL.

REFERENCES CITED

The following references are of record in the file of this patent:

UNITED STATES PATENTS

| Number | Name | Date |
|---|---|---|
| 2,398,411 | Cook | Apr. 16, 1946 |
| 2,427,569 | Nicolson | Sept. 16, 1947 |
| 2,434,644 | Fairweather | Jan. 20, 1948 |